United States Patent [19]

Kolsky et al.

[11] Patent Number: 5,110,525
[45] Date of Patent: May 5, 1992

[54] METHOD FOR MANUFACTURING A SUBSTANTIALLY RIGID WATER-DISPERSIBLE ARTICLE

[75] Inventors: Rodger E. Kolsky, Schenectady, N.Y.; William H. Hale, Sutton Ely, England

[73] Assignee: NET/TECH International, Inc., Baldwin, N.Y.

[21] Appl. No.: 516,148

[22] Filed: Apr. 30, 1990

[51] Int. Cl.⁵ .............................................. B29C 39/02
[52] U.S. Cl. .................................. 264/122; 106/197.1; 162/147; 252/363.5; 264/118; 264/DIG. 53
[58] Field of Search ............... 264/122, 113, DIG. 53; 252/363.5; 106/197.1; 428/288; 162/147

[56] References Cited

U.S. PATENT DOCUMENTS

| | | | |
|---|---|---|---|
| 2,771,377 | 11/1956 | Greminger | 106/197.1 |
| 2,965,508 | 12/1960 | Windover et al. | 106/197.1 |
| 4,031,179 | 6/1977 | Tatzel et al. | 264/126 |
| 4,508,595 | 4/1985 | Gåsland | 162/147 |
| 4,888,145 | 12/1989 | Allner et al. | 264/126 |

FOREIGN PATENT DOCUMENTS

| | | |
|---|---|---|
| 1103389 | 2/1968 | United Kingdom . |
| 1269622 | 4/1972 | United Kingdom . |
| 1371096 | 10/1974 | United Kingdom . |
| 2052544 | 1/1981 | United Kingdom . |

*Primary Examiner*—Jan H. Silbaugh
*Assistant Examiner*—Brian J. Eastley
*Attorney, Agent, or Firm*—R. Neil Sudol; Henry D. Coleman

[57] ABSTRACT

A method for manufacturing a substantially rigid water-dispersible article includes the step of mixing together an ionic water-soluble film-forming polymer, a non-ionic water-soluble film-forming polymer, a chemically purified finely divided highly bleached cellulose, and glass fiber wool. Water is added to the dry mixture to form a dough which is subsequently molded into the desired form and dried while being maintained in the molded form. A filler or extender such as talc or paper pulp may be added prior to the molding step. In addition, a wetting agent may be added to accelerate rewetting and dispersal of the article upon disposal thereof, while a hydrophobic composition may be added to the dough to form a water repellant surface layer or film during drying of the molded article.

10 Claims, No Drawings

METHOD FOR MANUFACTURING A SUBSTANTIALLY RIGID WATER-DISPERSIBLE ARTICLE

BACKGROUND OF THE INVENTION

This invention relates to a method for manufacturing a substantially rigid water-dispersible article. More particularly, this invention relates to a method for manufacturing a biodegradable and substantially rigid water-dispersible article such as a bedpan or other container. This invention also relates to a composition usable in such a method.

Bedpans, urine bottles, sputum cups and other containers used in hospitals, clinics and similar health care institutions are conventionally made of steel and synthetic resin material. The steel containers are washed and reused, while the plastic containers are generally discarded. It is to be noted that such plastic receptacles are not biodegradable and contribute significantly to the world's mounting waste disposal problems.

As an alternative material, the bedpans and other receptacles may be manufactured from paper mache or reconstituted paper pulp so that, after use by a patient, a container with its contents can be deposited inside a waste disposal machine and reduced to a coarse slurry through a combined wetting and mechanical action. The slurry is then washed down a drain into the local sewage system.

It has been proposed to manufacture water dispersible disposable containers from a mixture of cellulose powder, glass in powder or fibrous form and cellulose ether. The mixture of dry ingredients is combined with water and a resulting dough molded into the shape of a desired article such as a container.

Although articles manufactured pursuant to that proposed process are satisfactory for many purposes, a need has been recognized for containers with an enhanced or accelerated water dispersibility. Such containers must be sufficiently strong to support the weight of a heavy patient without accessory support frames or containers. In addition, the containers must be essentially completely water dispersible so as to wash cleanly through conventional sewage and waste disposal systems.

OBJECTS OF THE INVENTION

An object of the present invention is to provide an improved method for manufacturing a substantially rigid water-dispersible article, particularly a container such as a bedpan.

Another object of the present invention is to provide such a method wherein the resulting container is strong but not unduly massive.

Another, more particular, object of the present invention is to provide such a method wherein the resulting container has an enhanced water dispersibility.

A further particular object of the present invention is to provide a composition usable in such a method.

Yet another object of the present invention is to provide a method for manufacturing a substantially rigid water-dispersible article, wherein the article is provided on a surface with a thin layer of water repellant material.

SUMMARY OF THE INVENTION

A method for manufacturing a substantially rigid water-dispersible article comprises, in accordance with the present invention, the step of mixing together an ionic water-soluble film-forming polymer, a non-ionic water-soluble film-forming polymer, a chemically purified finely divided highly bleached cellulose, and glass fiber wool. Water is added to the dry mixture to form a dough which is subsequently formed into the desired shape and dried while being maintained in the formed shape. A filler or extender such as talc or paper pulp may be added prior to the article forming step.

The dough should be such that the resulting article is substantially rigid when dry. Preferably, the article is formed by a molding technique.

Pursuant to another feature of the present invention, at least one of the ionic water-soluble film-forming polymer and the non-ionic water-soluble film-forming polymer is a cellulose ether. Preferably, the ionic water-soluble film-forming polymer takes the form of sodium carboxymethyl cellulose, while the non-ionic water-soluble film-forming polymer is methyl cellulose and hydroxypropylmethyl cellulose, among others.

Pursuant to another feature of the present invention, the cellulose is at least approximately 99.5% pure and has a maximum fiber length of approximately 500 microns, a minimum fiber length of approximately 45 microns, an average fiber length of approximately 160 microns, and an average fiber width of approximately 30 microns.

In general, the weight ratio of ionic to non-ionic film-forming polymer ranges from about 50-50 to about 70-30. Preferably, the ionic film-forming polymer and the non-ionic film-forming polymer are mixed together in approximately equal parts by weight. However, in some instances, it is advantageous to have the ionic water-soluble film-forming polymer in a proportion twice as great as the proportional amount of non-ionic water-soluble film-forming polymer.

Pursuant to yet further features of the present invention, the cellulose is present in the range of about 25% to about 65% by weight of the total ingredients in the dry mixture, whereas the ionic water-soluble film-forming polymer is present in the range of approximately 2% to 10% by weight and the non-ionic water-soluble film-forming polymer is present in the range of approximately 1% to 10% by weight. The glass fiber wool is present in the rang of approximately 3% to 60% by weight of the total ingredients in the dry mixture.

A container such as a bedpan or sputum cup made in accordance with the present invention is biodegradable and water dispersible, even if buried in the damp earth. Such a container is substantially rigid, but if necessary, a plasticizer may be added during manufacture to provide flexibility.

Provided that the consistency of the dough during manufacture is correct, material produced by a method in accordance with the present invention can have a hardness equivalent to that of certain harder petrochemical resins but, in contrast to those resins, is water-soluble and is capable of forming rigid articles. A bedpan made in accordance with the present invention and having a wall thickness of approximately 3 millimeters is capable of supporting the weight of an average size patient.

In general, cross-linking agents are avoided in the present invention because of their tendency to render the cellulose ether insoluble. However, in certain instances, it may be possible to include certain types of cross-linkers in minor amounts. One of ordinary skill in the art will recognize that the amount and type of cross-linker used may be varied with an obvious effect on the final solubility of the compositions of the present invention.

Glass powder or silica, as used in glass making, may be used also as fillers or extenders. Glass fiber wool may also be used, generally transformed into a flocculated substance even in the dry state, once mixed with the bleached cellulose. Other filler ingredients may include volcanic ash, wood ash, bone ash and even paper ash.

Upon dispersion in water of a used container in accordance with the present invention, the residue is a fine silicalike powder which passes easily through drainage pipes and fine mesh wire and has a cleansing effect thereon.

Chopped strand fiber glass as used in matting is thicker and stronger than fiber glass wool and can be incorporated in a process in accordance with the present invention.

It is to be noted that the ionic water-soluble film-forming polymer included in a composition in accordance with the present invention gives rise to an outward migrating dissociation in water and increases the dispersibility with respect to the use of non-ionic water-soluble film-forming polymer alone. Although non-ionic water-soluble film-forming polymer will also disperse, they are swelling agents and are thus limited in their dispersibility.

Thus, higher amounts of nonswellable ionic water-soluble film-forming polymers relative to swellable non-ionic water-soluble film-forming polymers will decrease the dispersal times of the manufactured articles. Upon disposition of an article into a water-containing sewage or waste disposal receptacle, the ionic water-soluble film-forming polymer will enter solution at a higher rate and create cavities or voids within the material and thus accelerate the dissolution of the article.

In contrast, higher amounts of swellable water-soluble film-forming polymers such as methyl cellulose and hydroxypropylmethyl cellulose, among others, in a composition in accordance with the present invention will generally increase the dispersal times of the manufactured articles. Upon disposition of an article into a sewage or waste disposal receptacle, the swellable non-ionic water-soluble film-forming polymer absorbs water molecules and expands, prior to entering into solution. The swelling thus decreases the rate at which an article will disperse in water.

Depending on the viscosity of the polymers, an increase in the amount of the polymer will generally increase the strength of the articles.

Pursuant to a feature of the present invention, a wetting agent may be added to the dry mixture or to the dough to promote dispersal of an article upon placement of the article in a water-containing waste disposal machine. The wetting agent may reduce the amount of the ionic water-soluble film-forming polymer desired or required. Both the wetting agent and the ionic water-soluble film-forming polymer act to accelerate dispersal of a bedpan or other article. However, the two substances act according to different mechanisms: the wetting agent draws water into the article and thereby facilitates contact of the water with the material of the article, while the ionic water-soluble film-forming polymer dissolves rapidly in water and thereby advances the breakdown process. The wetting agent and the ionic water-soluble film-forming polymer may be used separately or in combination.

A wetting agent usable in forming an article in accordance with the present invention may take the form of any water-soluble chemical which significantly lowers aqueous surface tension when a composition or material including the wetting agent is placed into contact with an aqueous solution, emulsion or suspension. The wetting agent thereby promotes rewetting of the composition or material by drawing water into the material.

Preferably, the wetting agent is present in a weight range of approximately 0.05% to approximately 0.5% of the ingredients in the dry mixture.

Driers and/or plasticizers such as calcium chloride or glycerol may be used in the formulations, in proportions of up to 10% by weight of the dry solids. Recycled paper may also be incorporated in varying amounts. To obtain a complete separation of the paper fiber within the dough, volcanic ash, bone ash, wood ash, paper ash and/or talc may be added. The mixing of the dry ingredients can be carried out with a mechanical mixer such as that used in the bread making industry. The separation and mixing of the paper fibers results in an even distribution thereof in the colloidal silica cellulose dough which remains dispersible whether in a dry or wet state.

If waste paper is used to provide the paper pulp, the paper is preferably first macerated wet in a comminuting chamber and then allowed to dry to remove ink and other contaminants.

Although articles having a composition in accordance with the present invention may be made by any method available in the art, molding is preferably used. Molding in accordance with the present invention means forcing the dough material into a shaped mold. The dough used in the present invention is not a conventional slurry and the water is not drained off. Accordingly, the water-soluble film-forming polymers are retained in the dough as it dries and contribute to the water dispersibility of the resulting product.

In certain embodiments, it may be preferable to coat an inner surface of an article with a layer of moisture resistant material and/or to produce the article from composite layers of materials, the layer which is exposed to moisture during use of the article having a longer dispersal time than the remainder of the article. In this way, the article may be used for the storage of liquid waste during transport for disposal.

A dough used to produce an article provided on a surface with a water repellant or moisture resistant coating or film includes, in accordance with an embodiment of the present invention, a hydrophobic composition preferably in the form of a water-immiscible substance which may be carried either in an emulsion or in a colloidal suspension, in an aqueous solution. More preferably, the dough is formed in part from an aqueous solution carrying a water-immiscible liquid, such as an aluminum salt, a silicone, a silane, a fatty acid, a wax or an oil, dispersed in the water. Alternatively, silicone treated silica ("fumed silica") carried as a solid phase in water may be mixed with the dry ingredients to form the dough.

The dry ingredients preferably include a non-ionic water-soluble film-forming polymer, chemically purified finely divided highly bleached cellulose, and glass fiber wool and more preferably also include an ionic water-soluble film-forming polymer. As described hereinabove, at least one of the ionic water-soluble film-forming polymer and the non-ionic water-soluble film-forming polymer may be a cellulose ether. Preferably, the ionic water-soluble film-forming polymer takes the form of sodium carboxymethyl cellulose, while the non-ionic water-soluble film-forming polymer is methyl cellulose and hydroxypropylmethyl cellulose, among others. In addition, the weight ratio of ionic to non-ionic film-forming polymer generally ranges from about 50–50 to about 70–30. The cellulose is present in the range of about 25% to about 65% by weight of the total ingredients in the dry mixture, whereas the ionic water-soluble film-forming polymer is present in the range of approximately 2% to 10% by weight and the non-ionic water-soluble film-forming polymer is present in the range of approximately 1% to 10% by weight. The glass fiber wool is present in the range of approximately 3% to 60% by weight of the total ingredients in the dry mixture. Preferably, the hydrophobic composition has a weight ratio of 0.05% to 10% by weight of the total non-aqueous ingredients of the dough.

During drying of an article after shaping thereof, exemplarily by a molding technique, the water in the dough migrates to the surface of the article and carries with it the water-immiscible substance. Upon evaporation of the water at the surface of the article, the water-immiscible substance remains on the surface to form a moisture resistant or water repellant coating or film layer.

Pursuant to another embodiment of the present invention, a method for manufacturing a substantially rigid water-dispersible article comprises the steps of (a) mixing together in a dry state the following materials to form a first dry composition:
  (i) an ionic water-soluble film-forming polymer,
  (ii) a non-ionic water-soluble film-forming polymer,
  (iii) chemically purified finely divided highly bleached cellulose, and
  (iv) glass fiber wool;
(b) adding water to the first dry composition to form a first dough, (c) forming the first dough into a first predetermined shape having a first surface and a second surface on a side of the shape opposite the first surface, and (d) drying the first dough while the dough is maintained in the predetermined shape. Further steps include: (e) mixing together in a dry state the following materials to form a second dry composition:
  (i) a non-ionic water-soluble film-forming polymer,
  (ii) chemically purified finely divided highly bleached cellulose, and
  (iii) glass fiber wool;
(f) adding water to the second dry composition to form a second dough, (g) forming the second dough into a second predetermined shape, and (h) drying the second dough while the second dough is maintained in the second predetermined shape. The second predetermined shape is bonded to the first predetermined shape along only one of the first surface and the second surface to form a multilayered object.

The second dough is preferably dried prior to a placement of the second predetermined shape into contact with the first predetermined shape. In that case, the two shapes are placed into contact with one another, the bonding of the two shapes being implemented by wetting the surface or surfaces along which contact takes place.

Preferably, the second dry composition also includes an ionic water-soluble film-forming polymer. In accordance with this embodiment of the present invention, the ionic water-soluble film-forming polymer in the first dry composition has a greater weight ratio than the non-ionic water-soluble film-forming polymer in the first dry composition, the ionic water-soluble film-forming polymer in the second dry composition having a lesser weight ratio than the non-ionic water-soluble film-forming polymer in the second dry composition.

Pursuant to another feature of the present invention, the ionic water-soluble film-forming polymer in the first dry composition is the same as the ionic water-soluble film-forming polymer in the second dry composition. Similarly, the non-ionic water-soluble film-forming polymer in the first dry composition may be the same as the non-ionic water-soluble film-forming polymer in the second dry composition.

The ionic water-soluble film-forming polymer and/or the non-ionic water-soluble film-forming polymer of either or both of the dry compositions is preferably a cellulose ether. More particularly, the ionic water-soluble film-forming polymer of the first dry composition or the second dry composition or both is sodium carboxymethl cellulose. Also, the non-ionic water-soluble film-forming polymer of the first dry composition or the second dry composition or both is preferably methyl cellulose or hydroxypropylmethyl cellulose. However, one skilled in the art will apprehend that other specific water-soluble film-forming compositions may be used instead.

Pursuant to another feature of the present invention, the cellulose of either or both of the dry compositions is at least approximately 99.5% pure and has a maximum fiber length of approximately 500 microns, a minimum fiber length of approximately 45 microns, an average fiber length of approximately 160 microns, and an average fiber width of approximately 30 microns.

Pursuant to further features of the present invention, (a) the cellulose in each dry composition is present in the range of 25% to 65% by weight of the total ingredients in the respective dry composition, (b) the ionic water-soluble film-forming polymer in each dry composition is present in the range of approximately 2% to 10% by weight of the total ingredients in the respective dry composition, (c) the non-ionic water-soluble film-forming polymer in each dry composition is present in the range of approximately 1% to 10% by weight of the total ingredients in the respective dry composition, and (d) the glass fiber wool in each of the first dry composition and the second dry composition is present in the range of approximately 3% to 60% by weight of the total ingredients in the respective dry composition.

Each of the dry compositions may include filler or extender exemplarily in the form of talc and/or paper pulp. In addition, titanium dioxide may be added in small quantites to provide a white color to the article. It is believed that the titanium dioxide facilitates dispersal where a bleached fibrous pulp is incorporated. Although the talc and the titanium dioxide are not water soluble, the latter is used in small amounts and the former assumes a particulate form capable of being flushed along with water like the silica powder to which the glass fiber is reduced.

A substantially rigid water-dispersible article manufactured in accordance with the above-discussed embodiment of the present invention comprises a first predetermined shape and a second predetermined shape bonded to the first predetermined shape to form an object having multiple layers in at least one region.

Each of the predetermined shapes has a composition comprising:
  (i) approximately 1% to approximately 25% by weight of an ionic water-soluble film-forming polymer;
  (ii) approximately 0.5% to approximately 25% by weight of a non-ionic water-soluble film-forming polymer;
  (iii) approximately 15% to 80% by weight of chemically purified finely divided highly bleached cellulose; and
  (iv) approximately 1% to approximately 80% by weight of glass fiber wool.

The ionic water-soluble film-forming polymer in the composition of the first predetermined shape has a greater weight ratio than the non-ionic water-soluble film-forming polymer in the composition of the first predetermined shape, while the ionic water-soluble film-forming polymer in the composition of the second predetermined shape has a lesser weight ratio than the non-ionic water-soluble film-forming polymer in the composition of the second predetermined shape.

An outermost layer of a container made of a plurality of layers of varying water dispersibility in accordance with the present invention is generally thicker than the innermost layer of the container. For example, the innermost layer has a thickness between about 0.5 and 1.0 millimeters and the outermost layer has a thickness between about 1.0 and 3.0 millimeters.

DEFINITIONS

As used herein, the term "water-soluble film-forming polymers" includes all water-soluble polymeric substances capable of forming continuous layers upon drying and of bonding to other materials such as glass fibers and particles in a mixture. Examples of such water-soluble film-forming polymers are cellulosics such as sodium carboxymethyl cellulose, methyl cellulose, hydroxymethyl cellulose, hydroxyethyl cellulose, hydroxypropylmethyl cellulose, gums such as carrageenan and acacia, numerous vinyl polymers including polyvinyl alcohol (PVA) and polyvinyl pyrrolidone (PVP), and a number of salts of methacrylate and acrylate type polymers.

As used herein, the term "ionic water-soluble film-forming polymers" includes all polymeric substances described above which dissociate into ions or ionic radicals when placed in aqueous solution. An example is sodium carboxymethyl cellulose.

As used herein, the term "non-ionic water-soluble film-forming polymers" includes all polymeric substances described above which do not dissociate into ions or ionic radicals when placed in aqueous solution but are water-soluble, generally after first swelling. Examples are methyl cellulose, hydroxymethyl cellulose, hydroxyethyl cellulose and hydroxypropylmethyl cellulose.

As used herein, the term "wetting agent" includes any water-soluble chemical which significantly lowers aqueous surface tension when a composition or material including the wetting agent is placed into contact with an aqueous solution, emulsion or suspension. The wetting agent thereby promotes rewetting of the composition or material by drawing water into the material. Examples of wetting agents include alkyl ethoxylates and ethoxylated alkyl phenols sold under the TRITON trademark series (Rohm & Haas) and AEROSOL TO (American Cyanimide) and many compositions having surfactant-like qualities.

As used herein, the term "hydrophobic composition" refers to a water-immiscible substance which may be carried either in an emulsion or in a colloidal suspension, in an aqueous solution. More particularly, the term encompasses a water-immiscible liquid, such as an aluminum salt, a silicone, a silane, a fatty acid, a wax or an oil, dispersed in water. The term also encompasses silicone treated silica ("fumed silica") carried as a solid phase in water.

A "dough" as that word is used herein means a pliable, deformable, flowable mass capable of being molded, extruded, and/or pressed into any of a variety of shapes including bedpans, urine bottles, sputum cups and other containers used in hospitals, clinics and similar health care institutions, as well as food trays, cups, plates and other temporary storage containers. Such a dough includes an aqueous component which is of a sufficiently great weight ratio or proportion to enable mass flow of the dough under pressures typically exertable in molding technology. The water content of the dough is not so great, however, that the dough loses its ability to cohere and form a continuous solid or semi-solid mass.

The word "cellulose" means any composition having the formula $(C_6H_{10}O_5)_n$.

EXAMPLES OF THE INVENTION

The following examples are provided by way of illustration only and should not be viewed as limiting the scope of the invention in any way.

EXAMPLE I

A dough is prepared having the following composition, by weight:
1 part ionic water-soluble cellulose ether
1 part non-ionic water-soluble cellulose ether
8 parts bleached cellulose powder, with particle sizes varying from 45 microns to 150 microns and with a cellulosic content of approximately 80% alpha cellulose, and 14.5% beta and gamma cellulose (alpha contents can vary up to 09%)
6 parts glass fiber wool.

Water is added in a minimum amount (on the order of half of the entire weight of the dough, in this case approximately 16 parts) in order to produce an optimal wetting of the water-soluble polymer. The bleached cellulose took the form of a product commercialized under the trademark CEPO and produced by the company The Swedish Cellulose Powder and Woodflour Mills LTD.

Driers and/or plasticizers such as calcium chloride or glycerol may be used in the formulations, in proportions of up to 10% by weight of the dry solids. Recycled paper can be incorporated in varying amounts. To obtain a complete separation of the paper fiber within the dough, volcanic ash, bone ash, wood ash, paper ash and/or talc can be added. The mixing of the dry ingredients can be carried out with a mechanical mixer such as that used in the bread making industry. The separation and mixing of the paper fibers has resulted in an even distribution thereof in the colloidal silica cellulose dough which remains dispersible whether in a dry or wet state.

EXAMPLE II

A material is prepared having the following formulation, in parts by weight:
- ½ part non-ionic water-soluble cellulose ether sold under the trademark CELACOL HPM 5000 (Courtaulds Acetate Spondern Derby, England)
- ½ part non-ionic water-soluble cellulose ether sold under the trademark COURLOSE F. 1000 (Courtaulds Acetate Spondern Derby, England)
- 4 parts bleached cellulose powder sold under the trademark CEPO S.20
- 8 parts glass fiber wool
- 28 parts water The dry products (bleached cellulose powder and glass fiber) plus any other extender were mixed together in a conventional mixing machine to produce a silica-like material, and the cellulose ether is added. Then the water is added and mixing continued until a dough is produced. During the mixing process, the chemical and/or electric reaction and the physical agitation caused the glass fibers to break down into a silica-like mass and the resulting dough is not fibrous, as normal paper is, though some short fibers were present in the dough.

The dough is then formed into a mold designed to produce a self-supporting bedpan (other articles could be produced by the method) and the material is allowed to partially or fully set in the mold before it is withdrawn from the mold. After removal from the mold, the article is allowed to dry so that it became a rigid bedpan and had an appearance and feel similar to that of an article made in a hard grade of plastics. However, the bedpan produced by this method is very rapidly dispersible in water, because of its constituents, and hence would not be suitable for use by a patient. The inside exposed surface of the bedpan or article is therefore preferably provided with a non-toxic water-repellant coating which will enable it to withstand the water content of urine or other water containing material during use.

Upon use of a bedpan manufactured in accordance with the invention, the bedpan is placed in the comminuting chamber of a hospital-type waste disposal machine, and when the machine is operated, the bedpan is subjected to spraying and immersion in water and to a rapid mechanical agitation. As a result, the bedpan breaks down and is rapidly dissolved and dispersed in the water in the form of very fine silica particles, which pass easily out through the drain to which the machine is connected. It is known that most if not all the material forming the bedpan is dissolved by the water penetrating the structure of the article and cannot be held like a conventional paper mass.

In the above Example, the bedpan is formed by gravity molding, but it is to be understood that other molding techniques could be employed, for example, vacuum molding or spreading on a former by an extrusion process. Further, the article may be dried by a hot atmospheric process, or it may be carried out at an elevated temperature (e.g., 100° C.), in order to accelerate the drying, or the article may be dried in a vacuum chamber, in which the moisture content is caused to evolve as vapor, due to the reduction in pressure. The vacuum drying technique is particularly advantageous, in that it can be carried out very rapidly, so long as it is not so rapid that the article suffers physical disintegration.

EXAMPLE III

A material is prepared having the following formulation, in parts by weight:
- 3½ parts glass fiber
- 4 parts CEPO S.20 powder
- ½ part CELACOL M 450 (non-ionic)
- ½ part COURLOSE F. 1000 (ionic)
- 20 parts water The manufacturing technique is identical to that described hereinabove with reference to Example II, but because of the difference in composition, a very tough bedpan is produced, which would require something less than one half hour to disperse if left in water. Of course, dispersal time can be reduced by mechanical action, including comminution of the bedpan at the waste disposal station and agitation of the shredded bedpan.

EXAMPLE IV

A material is prepared having the following formulation, in parts by weight:
- ½ part CELACOL M 450 (non-ionic)
- ½ part COURLOSE F. 1000 (ionic)
- 8 parts CEPO S.20 powder (bleached cellulose)
- 4 parts talc
- 3 parts glass fiber
- 16 parts water Again, the manufacturing technique is the same as described above with reference to Example II. This formulation is a medium formulation which will provide a strong bedpan and at the same time one which can be dispersed in a hospital waste disposal machine in a relatively short time. The use of ionic water-soluble polymer accelerates the dispersal of the bedpan, once it is placed in the waste disposal machine or facility. The ionic water-soluble polymer will enter solution at a high rate and create cavities or voids within the material and thus accelerate the dissolution of the bedpan. The ionic water-soluble polymer also contributes in this formulation, as well as all the exemplary formulations provided herein, to the breakdown of the glass fibers during the mixing process to produce a silica-like mass. Upon drying of the molded bedpan or other container, both the ionic and non-ionic polymers serve to bind the broken down glass fibers to each other to form a strong and substantially rigid article.

EXAMPLE V

A material is prepared having the following formulation, in parts by weight:
- 1 part paper pulp
- 1 part glass fiber
- ¼ part titanium dioxide
- 1½ part talc
- ½ part CELACOL M 450 (non-ionic)
- ½ part COURLOSE F. 1000 (ionic)
- ¼ part CEPO S.20 (bleached cellulose)
- 7 parts water The above ingredients are first mixed together dry in a high speed mixer similar to the mixers used for dough mixing in the bread making process, in order to obtain a finely flocculated mass, the glass fibers having been reduced in bulk by the chemical and mechanical reaction of the bleached cellulose and after a few seconds of the severe dry mixing, the whole is ready to receive the water. Then the water is added and approximately one minute of further high speed mixing produces a dough ready for use, although it is preferable to leave the dough approximately twenty minutes before molding to provide the additional precaution of ensuring complete wetting out of the cellulose ether content. The dough is then molded and dried, producing a very tough, shaped bedpan, which apart from being stronger than a bedpan made from reconstituted paper pulp, is completely dispersible in water. An alternative method of mixing the ingredients is to add the water to any recycled paper pulp first and then add the slurried paper pulp to the other dry, but previously mixed, components.

EXAMPLE VI

A material is prepared having the following formulation, in parts by weight:
  3½ parts glass fiber
  4 parts CEPO S.20 (bleached cellulose)
  1 part talc
  1 part titanium dioxide
  ½ part CELACOL M 450 (non-ionic)
  ½ part COURLOSE F. 1000 (ionic)
  3 parts paper pulp
  40 parts water The above ingredients are mixed in a manner similar to that described above with respect to Example V and a good bedpan is produced, which, although not as strong as the one made in Example V above, nevertheless rapidly disperses in water and has an adequate strength for some purposes.

EXAMPLE VII

A material is prepared having the following formulation, in parts by weight:
  3½ parts glass fiber
  4 parts CEPO S.20 (bleached cellulose)
  1 part talc
  ½ part titanium dioxide
  ½ part CELACOL M 450 (non-ionic)
  1 part COURLOSE F. 1000 (ionic)
  20 parts water A similar method is used as that described in Example V, but the water is added in the method of this example to the already mixed dry ingredients. It will be noted that no recycled paper products are used herein.

EXAMPLE VIII

A material is prepared having the following formulation, in parts by weight:
  3½ parts glass fiber
  4 parts CEPO S.20 (bleached cellulose)
  1 part titanium dioxide
  ½ part CELACOL M 450 (non-ionic)
  ½ part COURLOSE F. 1000 (ionic)
  26 parts water This formulation is used in a method as described above hereinabove with reference to Example VII. This formulation results in a strong container product with good dispersal characteristics.

EXAMPLE IX

A material is prepared having the following formulation, in parts by weight:
  1½ parts bleached paper pulp
  2 parts glass fiber
  14 parts CEPO S.20 (bleached cellulose)
  32 parts talc
  2 parts titanium dioxide
  ½ part CELACOL M 450 (non-ionic)
  1 part COURLOSE F. 1000 (ionic)
  60 parts water This formulation contains bleached cellulose fibrous pulp, e.g., as sold commercially by Weyerhaeuser Corporation, as well as bleached cellulose powder, to produce a strong article. It is believed that the titanium dioxide helps dispersal where bleached fibrous pulp is incorporated.

EXAMPLE X

A material is prepared having the following formulation, in parts by weight:
  1½ parts bleached paper pulp (Weyerhaeuser)
  2 parts glass fiber
  7 parts CEPO S.20 (bleached cellulose)
  7 parts CEPO SS.350 (45 microns)
  32 parts talc
  2 parts titanium dioxide
  ½ part CELACOL M 450 (non-ionic)
  1 part COURLOSE F. 1000 (ionic)
  58 parts water It is to be noted that finely divided ash, as mentioned hereinabove, can be incorporated into any of the formulations. The ash can be premixed with the other dry ingredients prior to mixing with water, and it is not necessary to use further water-soluble polymer.

COURLOSE and CELACOL are tradenames of Courtaulds Colloids LTD. COURLOSE ether is sodium carboxymethyl cellulose, while CELACOL M is methyl cellulose and CELACOL H.P.M.C. is hydroxypropylmethyl cellulose. Many different viscosites of these substances are available. Many are also available from Bayer.

A bedpan or other container which is to temporarily hold a liquid substance may be provided on its surfaces with a thin layer of a moisture resistant or water repellant substance. Such a substance may be applied in a spraying step performed subsequently to the molding of the dough. Alternatively, the dough is mixed, prior to the molding step, with a hydrophobic composition comprising a water-immiscible liquid, such as an aluminum salt, a silicone, a silane, a fatty acid, a wax or an oil, dispersed in water. More particularly, the water added to the dry mixture to form the dough may be a weak emulsion of such a water-immiscible or hydrophobic substance. The concentration of the hydrophobic substance should be in the range of 0.05% to 10% by weight of the dry ingredients in the dough and preferably in the range of 0.1% to 1% by weight of the dry ingredients.

During the drying of a molded dough to which an emulsion of a water-immiscible hydrophobic substance has been added, the water migrates to the surface of the molded form, bringing with it the hydrophobic substance, which is then deposited on the surface of the molded form upon evaporation of the water. Thus, a thin layer of hydrophobic, water repellant material is automatically deposited on the container surface during the manufacturing process and, more specifically, during the drying process. In the case that the hydrophobic material is a silane, this substance reacts chemically with the cellulosics, cellulose and/or glass and bonds to the outer surface of the molded form.

Another hydrophobic composition or substance which may be added to the dough to form a water repellant or moisture resistant outer layer is silicone treated silica. The silica is a solid phase in water but is nevertheless carried to the surface of the drying molded container or article with the migrating water and remains as a deposited hydrophobic layer on that surface.

Some examples of doughs provided with a hydrophobic composition are the following:

EXAMPLE XI

A material is prepared having the following formulation, in parts by weight:
3 parts glass fiber
4 parts CEPO S.20 (cellulose powder)
½ part CELACOL M 450 (non-ionic)
½ part COURLOSE F. 1000 (ionic)
½ part silicone
20 parts water The glass fiber, the cellulose powder, and the ionic and non-ionic cellulose ethers are first mixed together in a dry state. Then the water with the silicone emulsified therein are added and mixed with the dry ingredients to form a dough. As described hereinabove, the dough is subsequently molded into the form of a bedpan or other container and allowed to dry. The drying may be accelerated by the application of heat energy, either by convection alone or with the aid of a blower, or by the emission of microwave and/or infrared radiation. During the drying process, the silicone migrates to the outer surfaces of the molded article with the water and is deposited on the outer surfaces when the water evaporates. The resulting silicone film is water repellant and serves to delay dissolution of the article upon contact with an aqueous solution or wet mixture. After it has been used, the article is deposited into a waste disposal machine, preferably a machine having mechanical comminuting components for macerating the article and thereby facilitating water contact with the water dispersal body of the article. As discussed above, the ionic cellulosic quickly enters into solution and accelerates the dispersal of the article in the water in the waste disposal machine.

EXAMPLE XII

A material is prepared having the following formulation, in parts by weight:
3 parts glass fiber
4 parts CEPO S.20 (cellulose powder)
1 part CELACOL M 450 (non-ionic)
½ part silicone
½ part TRITON X100 (wetting agent)
20 parts water In this formulation, the ionic cellulose ether is omitted. The wetting agent may be added in dry form and mixed with the dry ingredients prior to addition of the water. Alternatively, the wetting agent may be dissolved beforehand in the water. Upon use of the article formed during molding and drying steps, the article is deposited in a waste disposal unit where the article is macerated. The maceration or comminution breaks the continuous water repellant layer formed by the silicone and enables water to penetrate to the body of the article. The wetting agent accelerates dispersal of the material by drawing water into the material. The wetting agent significantly lowers surface tension and thereby promotes rewetting of the molded material.

EXAMPLE XIV

A material is prepared having the following formulation, in parts by weight:
½ part CELACOL M 450 (non-ionic)
½ part COURLOSE F. 1000 (ionic)
8 parts CEPO S.20 powder (bleached cellulose)
4 parts talc
3 parts glass fiber
½ part silicone
½ part TRITON X100 (wetting agent)
18 parts water This formulation incorporates a wetting agent (TRITON X100 produced by Rohm & Haas) in addition to the ionic cellulose ether and is accordingly particularly quick to dissociate and disperse in water. In this and other formulations, other wetting agents such as AEROSOL TO produced by American Cyanimide may be used instead of TRITON X100. Moreover, other water-immiscible hydrophobic compositions may be used in place of the silicone. Such substitutes, as discussed hereinabove, include aluminum salts, silanes, fatty acids such as stearic acid, waxes or oils, emulsified in water. Similarly, the cellulosics may be replaced with any ionic and non-ionic water-soluble film-forming polymers which form a continuous layer bonding the glass particles and fibers to each other. Such polymers include polyvinyl alcohols (PVAs), polyvinyl pyrrolidones (PVPs), starches, gums, and salts of organic materials, such as sodium acrylate.

In an alternative method for providing a water-dispersible article having an inner surface which is relatively moisture resistant and an outer surface or wall which is easily dispersed in water, the article is manufactured to have a multilayered structure. In this case, an inner layer is molded from one of the above formulations (or a formulation otherwise within the contemplation of the invention) which has a relatively lower rate of dispersal in water. The remainder of the container, in particular, the outer walls or surfaces, is formed from a formulation having a relatively high dispersal rate in water. Specifically, the inner or moisture contacting layer is preferably made of a formulation having a higher weight percentage of non-ionic water-soluble polymer (e.g., methyl cellulose or hydroxypropylmethyl cellulose) than ionic water-soluble polymer (e.g., sodium carboxymethyl cellulose), while the outer portion of the container has a higher weight percentage of ionic water-soluble polymer than of non-ionic water-soluble polymer. In addition, the outer layer or wall of the container advantageously includes a wetting agent which, together with the high concentration of ionic water-soluble film-forming polymer, serves to accelerate the dissolution of the molded article upon placement thereof in the water of a waste disposal unit.

The outer layer of such a multilayered container or article may, for example, comprise the formulation set forth above in Examples XI, IX, X or XIV or may comprise the following formulation:

EXAMPLE XV

A material is prepared having the following formulation, in parts by weight:
3 parts glass fiber
4 parts CEPO S.20 powder
½ part CELACOL M 450 (non-ionic)
½ part COURLOSE F. 1000 (ionic)
½ part TRITON X100 (wetting agent)
20 parts water In contrast to the outer wall or layer of a multilayered article or container manufactured pursuant to this embodiment of the invention, the inner wall or layer has a low ionic polymer content and may be devoid of wetting agent. The following formulation is useful for making the inner, moisture contacting layer.

EXAMPLE XVI

A material is prepared having the following formulation, in parts by weight:
1 part CELACOL M 450 (non-ionic)
8 parts CEPO S.20 powder (bleached cellulose)
4 parts talc
3 parts glass fiber
16 parts water In this instance, the inner, water contacting layer is slower to dissolve in the presence of the moist contents and enables a temporary storage prior to disposal of the entire bedpan or sputum cup in a hospital waste disposal machine. Upon the deposition of the moisture containing article in a water reservoir within the waste disposal machine, the outer wall of the article begins to rapidly deteriorate and dissolve in the water. The wetting agent draws water into the outer wall or layer, while the sodium carboxymethyl cellulose quickly dissolves, thereby forming cavities further accelerating the dissolution of the outer wall and increasing the contact of the water with the inner wall.

The outer wall or main body of the article is first molded and dried. The inner layer is molded separately and dried, as well. Upon drying of both layers, a water film is applied to the inner surface of the outer wall or layer and the inner wall or layer placed into contact with the wetted surface. The water film causes a temporary dissolution of a part of the outer wall and a smaller part of the inner wall portion. Subsequent drying forms a bond between the two layers.

The inner wall or layer may be formed of a dough comprising any of the formulations set forth hereinabove in Examples I-X, provided that the ionic cellulose ether is replaced by a substantially equivalent amount of non-ionic cellulose ether so that the entire cellulose ether content is non-ionic.

Generally, the ionic water-soluble polymer and the non-ionic water-soluble polymer used in the formulations of the two premolded shapes or layers of a container will be the same. The ionic water-soluble polymer is preferably sodium carboxymethyl cellulose, as marketed under the trademark COURLOSE, while the non-ionic water-soluble polymer is preferably methyl cellulose or hydroxypropylmethyl cellulose marketed under the trademark CELACOL. Similarly, the formulations of the inner and outer layers of the article will both contain a chemically purified finely divided highly bleached cellulose such as that marketed under the trademark CEPO S.20, and glass fiber wool. Other ingredients such as titanium dioxide and ash fillers may be added as described above with reference to the various specific formulation examples. However, the identities and amounts of these fillers and the amounts of titanium dioxide may differ between the two formulations.

Other examples pursuant to the present invention are as follows:

EXAMPLE XVII

A material is prepared having the following formulation, parts by weight:
3½ parts glass fiber
4 parts CEPO S.20 powder
½ part CELACOL M 450 (non-ionic)
½ part COURLOSE F. 1000 (ionic)
½ part stearic acid
½ part TRITON X100 (wetting agent)
20 parts water In this formulation, the stearic acid functions to form a moisture resistant or water repellant surface layer on the molded article during the drying process. The stearic acid migrates to the surface of the article during drying and remains on the surface upon evaporation of the water content of the molded article. During disposal of the article upon use thereof, the wetting agent and the ionic cellulose ether accelerate dispersal of the article.

EXAMPLE XVIII

A material is prepared having the following formulation, in parts by weight:
½ part CELACOL M 450 (non-ionic)
½ part COURLOSE F. 1000 (ionic)
8 parts CEPO S.20 powder (bleached cellulose)
4 parts talc
3 parts glass fiber
½ part stearic acid
16 parts water

EXAMPLE IX

A material is prepared having the following formulation, in parts by weight:
3½ parts glass fiber
4 parts CEPO S.20 (bleached cellulose)
1 part talc
½ part titanium dioxide
½ part CELACOL M 450 (non-ionic)
1 part COURLOSE F. 1000 (ionic)
1 part stearic acid
1 part wetting agent
20 parts water

EXAMPLE XX

A material is prepared having the following formulation, in parts by weight:
1½ parts bleached paper pulp
2 parts glass fiber
14 parts CEPO S.20 (bleached cellulose)
32 parts talc
2 parts titanium dioxide
½ part CELACOL M 450 (non-ionic)
1 part COURLOSE F. 1000 (ionic)
½ part stearic acid
½ part wetting agent
60 parts water As disclosed by the above examples, the cellulose in each dry composition or formulation is present in the range of 25% to 65% by weight of the total ingredients in the respective dry composition. In addition, the ionic water-soluble polymer in each dry composition is present in the range of approximately 2% 10% by weight of the total ingredients in the respective dry composition, while the non-ionic water-soluble polymer in each dry composition is present in the range of approximately 1% to 10% by weight of the total ingredients in the respective dry composition. The glass fiber wool in each dry composition is present in the range of approximately 3% to 60% by weight of the total ingredients in the respective dry composition.

Example XXI

A material was prepared having the following formulation, in parts by weight:

1 part CELACOL HPM 450 (non-ionic)
½ part COURLOSE SCMC F.20 (ionic)
4 parts glass wool fiber
1 part CEPO S.100 ST (stearic acid coated cellulose)
18 parts water

EXAMPLE XXII

A material was prepared having the following formulation, in parts by weight:
¼ part COURLOSE SCMC F. 20 (ionic)
¾ part CELACOL HPM 450 (non-ionic)
4 parts CEPO S.100 ST (stearic acid coated cellulose)
4 parts glass wool fiber
14 parts water Example XXIII A material was prepared having the following formulation, in parts by weight:
6 parts glass wool fiber
4 parts CEPO S.100 ST (stearic acid coated cellulose)
¼ part COURLOSE SCMC F. 20 (ionic)
¾ part CELACOL HPM 450 (non-ionic)
17 parts water

EXAMPLE XXIV

A material was prepared having the following formulation, in parts by weight:
8 parts glass wool fiber
4 parts CEPO S.200 ST (stearic acid coated cellulose)
¼ part COURLOSE SCMC F. 20 (ionic)
¾ part CELACOL HPM 450 (non-ionic)
26 parts water The addition of greater amounts of non-ionic cellulose ether in the formulations of Examples XXI–XXIV resulted in doughs which did not have so much a thixotropic effect as in formulations where the concentration of ionic cellulose ether was higher that the concentration of non-ionic cellulose ether.

As will be apparent to one skilled in the art from an understanding of the operative principles of the invention as set forth herein, the operative or useful range of the weight ratios or percentages of the various ingredients may be enlarged, while still obtaining a useful composition. Accordingly, each composition or formulation may include approximately 1% to approximately 25% by weight of an ionic water-soluble polymer (e.g., sodium carboxymethyl cellulose), approximately 0.5% to approximately 25% by weight of a non-ionic water-soluble polymer (e.g. methyl cellulose or hydroxypropylmethyl cellulose), approximately 15% to 80% by weight of chemically purified finely divided highly bleached cellulose, and approximately 1% to approximately 80% by weight of glass fiber wool. Each of the dry compositions may include titanium dioxide and filler or extender exemplarily in the form of talc, ash and/or paper pulp.

It is to be understood that increasing the water content in the above formulations results in a dough which is more pliable and hence easier to mold. In addition, using water-soluble film-forming polymers with a lower viscosity results in more rapid drying times.

In an article manufactured from two compositions, wherein an outer layer of the article preferably incorporates a relatively high percentage of an ionic water-soluble polymer, such a polymer, which is relatively nonswellable, dissolves quickly in water and allows the outer layer to disperse at an accelerated rate upon placement of the article in a water-containing receptacle. In contrast, the inner layer of the article preferably incorporates a relatively high percentage of swellable non-ionic water-soluble polymer. That polymer, although water dispersible, dissolves at a markedly lower rate than the ionic water-soluble polymer and therefore provides the inner layer of the article (e.g. bedpan) with a reduced dissolution rate.

An outermost layer of a container made of a plurality of layers of varying water dispersibility in accordance with the present invention is generally thicker than the innermost layer of the container. For example, the innermost layer has a thickness between 0.5 and 1.0 millimeters and the outermost layer has a thickness between 1.0 and 3.0 millimeters.

Although the invention has been described in terms of particular embodiments and applications, one of ordinary skill in the art, in light of this teaching, can generate additional embodiments and modifications without departing from the spirit of or exceeding the scope of the claimed invention. For example, containers manufactured in accordance with the invention, particularly containers provided with a coating layer or film of a water repellant substance, may be used in the fast food industry, as disposable cups and disposable receptacles for food items. Any hydrophobic substance which is emulsifiable in water may be used to form the water repellant coating during the drying process. Accordingly, it is to be understood that the drawings and descriptions herein are proferred by way of example to facilitate comprehension of the invention and should not be construed to limit the scope thereof.

What is claimed is:

1. A method for manufacturing a substantially rigid water-dispersible article, comprising the steps of:
   mixing together in a dry state the following materials:
      a water-soluble film-forming polymer,
      chemically purified finely divided highly bleached cellulose, and
      glass fiber wool;
   adding water to the dry mixture to form a dough;
   adding to said dough a hydrophobic composition in the form of a water-immiscible hydrophobic liquid substance dispersed in water;
   forming the dough into a predetermined shape; and
   drying the dough while the dough is maintained in said predetermined shape said water-immiscible hydrophobic liquid substance migrating to the surface of the article to form a moisture resistant or water-repellant coating or film layer.

2. The method defined in claim 1 wherein said hydrophobic liquid is taken from a group consisting of aluminum salts, silicones, silanes, fatty acids, waxes and oils.

3. The method defined in claim 1 wherein said hydrophobic liquid is present in the range of about 0.05% to about 10% by weight of the total non-aqueous ingredients of said dough.

4. The method defined in claim 1 wherein said hydrophobic liquid is present in the range of about 0.1% to about 1% by weight of the total non-aqueous ingredients of said dough.

5. The method defined in claim 1 wherein said film-forming polymer is present in a weight range from approximately 1% to approximately 25% of the dry mixture, said chemically purified finely divided highly bleached cellulose is present in a weight range of approximately 15% to approximately 80% of the dry mixture, said glass fiber wool is present in a weight range of approximately 1% to approximately 80% of the dry mixture.

6. The method defined in claim 1 wherein said step of mixing includes the step of mixing a wetting agent in with said materials.

7. The method defined in claim 1, further comprising the step of adding the said dough a wetting agent.

8. A method for manufacturing a substantially rigid water-dispersible article, comprising the steps of:
mixing together the following materials to make a dough:
a water-soluble film-forming polymer,
chemically purified finely divided highly bleached cellulose,
glass fiber wool,
water, and
a hydrophobic composition in the form of a water-immiscible hydrophobic liquid substance dispersed in water;
forming the dough into a predetermined shape; and
drying the dough while the dough is maintained in said predetermined shaped, said water-immiscible hydrophobic liquid substance migrating to the surface of the article to form a moisture resistant or water-repellant coating or film layer.

9. The method defined in claim 8 wherein said step of mixing comprising the steps of:
combining together in a dry state the following materials:
a water-soluble film-forming polymer,
chemically purified finely divided highly bleached cellulose, and
glass fiber wool;
adding the water to the dry mixture to form the dough; and
adding the hydrophobic composition to the dough.

10. A method for manufacturing a substantially rigid water-dispersible article, comprising the steps of:
mixing together in a dry state the following materials:
a water-soluble film-forming polymer,
chemically purified finely divided highly bleached cellulose, and
glass fiber wool;
adding water to the dry mixture to form a dough;
adding to said dough a hydrophobic composition in the form of silicone treated silica suspended in water;
forming the dough into a predetermined shape; and
drying the dough while the dough is maintained in said predetermined shape said silicone treated silica migrating to the surface of the article to form a moisture resistant or water-repellant coating or film layer.

* * * * *